United States Patent
Wright et al.

(10) Patent No.: US 6,241,898 B1
(45) Date of Patent: *Jun. 5, 2001

(54) METHOD FOR INHIBITING MICROBIAL ADHESION ON SURFACES

(75) Inventors: J. Barry Wright, Jacksonville; M. Christine Johnson, St. Augustine, both of FL (US)

(73) Assignee: BetzDearborn Inc., Trevose, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/039,967

(22) Filed: Mar. 16, 1998

Related U.S. Application Data

(62) Division of application No. 08/635,124, filed on Apr. 19, 1996, now abandoned.

(51) Int. Cl.$^7$ ........................................... C02F 1/50
(52) U.S. Cl. ..................... 210/764; 162/161; 210/698; 424/78.09
(58) Field of Search .................... 162/161; 210/698–701, 210/749, 764, 928; 424/78.09

(56) References Cited

U.S. PATENT DOCUMENTS

| | | | |
|---|---|---|---|
| 2,121,616 | 6/1938 | Werntz | 260/99.12 |
| 4,285,765 | 8/1981 | Pera et al. | 162/161 |
| 4,289,581 * | 9/1981 | Katayama et al. | 162/161 |
| 4,295,932 * | 10/1981 | Pocius | 162/161 |
| 4,582,702 | 4/1986 | Grollier | 424/52 |
| 4,828,849 | 5/1989 | Lynch et al. | 424/52 |
| 4,975,109 | 12/1990 | Friedman, Jr. et al. | 71/67 |
| 4,976,874 * | 12/1990 | Gannon et al. | 210/755 |
| 5,048,199 | 9/1991 | Cole | 34/9 |
| 5,380,756 | 1/1995 | Andrews et al. | 514/552 |
| 5,439,681 | 8/1995 | Khan et al. | 424/400 |
| 5,512,186 | 4/1996 | Wright et al. | 210/764 |
| 5,512,211 | 4/1996 | McSwigan et al. | 252/353 |
| 5,549,847 | 8/1996 | Goliro et al. | 252/394 |
| 5,573,641 | 11/1996 | Meade et al. | 162/158 |
| 5,593,599 | 1/1997 | Wright et al. | 210/764 |
| 5,607,597 | 3/1997 | Wright et al. | 210/755 |
| 5,670,055 * | 9/1997 | Yu et al. | 210/698 |
| 5,736,058 * | 4/1998 | Wright et al. | 210/764 |
| 5,762,757 | 6/1998 | Nguyen et al. | 162/158 |
| 5,942,219 * | 8/1999 | Hendriks | 424/78.09 |
| 6,039,965 | 3/2000 | Donlan et al. | 424/405 |

FOREIGN PATENT DOCUMENTS

| | | |
|---|---|---|
| 1080578 * | 1/1980 | (CA) . |
| 4325923 | 2/1995 | (DE) . |
| 0302701 | 2/1989 | (EP) . |
| 56-057888 | 5/1981 | (JP) . |
| 06293607 | 10/1994 | (JP) . |
| 06298603 | 10/1994 | (JP) . |

OTHER PUBLICATIONS

Database WPIL, week 8127, London: Derwent Publications, Ltd., AN–81–48872D, Class A10, JP56057888 A (Lion Corp.), 1981, abstract.

Database WPIL, week 9502, London: Derwent Publications, Ltd., AN–95–009516, Class A01, JP6293607 A (Tokuyama Soda KK), 1995, abstract.

Database WPIL, week 9502, London: Derwent Publications, Ltd., AN–95–011711, Class A01, JP6298603 A (Takeda Chem. Ind. Co. Ltd.), 1995, abstract.

Database WPIDS on STN, week 9511, London: Derwent Publications, Ltd., AN 95–075624, Class A25, DE 4 325 923 A1 (Henkel KGaA), 1995, abstract.

TETRONIC® Block Copolymer Surfactants, downloaded from website www.basf.com/businesses/chemicals/performance/html/tetronic.html on Aug. 3, 1999.

PLURONIC® Block Copolymer Surfactants, downloaded from website www.basf.com/businesses/chemicals/performance/html/pluronic_grid_java.html on Aug. 3, 1999.

Blainey et al., "The Use of Block Copolymers to Inhibit Bacterial Adhesion," *Biofouling*, 1991, vol. 4, pp. 308–318.

Hales, Biodegradation of the Anionic Surfactant Dialkyl Sulphosuccinate, *Environmental Toxicology and Chemistry*, 1993, vol. 12, pp. 1821–1828.

Humphries et al., "The Use of Nonionic Ethoxylated and Propoxylated Surfactants to Prevent the Adhesion of Bacteria to Solid Surfaces," *FEMS Microbiology Letters*, 1987, vol. 42, pp. 91–101.

* cited by examiner

*Primary Examiner*—Peter A. Hruskoci
(74) *Attorney, Agent, or Firm*—Greenblum & Bernstein, P.L.C.

(57) ABSTRACT

A treatment for inhibiting the microbial adhesion on surfaces in contact with an aqueous system is disclosed, which comprises adding to the system the combination of an alkylsulfosuccinate surfactant and a block copolymer.

11 Claims, No Drawings

METHOD FOR INHIBITING MICROBIAL ADHESION ON SURFACES

This is a continuation of application Ser. No. 08/635,124 filed Apr. 19, 1996 now abandoned.

BACKGROUND OF THE INVENTION

Bacterial attachment to surfaces in virtually any non-sterile aquatic environment is a well-established phenomenon. Industrial efforts to prevent colonization or to clean fouled surfaces amount to costly expenditures in a number of industrial sectors. Often, such expenditures are made for cleaning programs that include the use of surfactants. Surfactants are regularly employed in water treatment programs as agents believed to play a role in the removal of organic masses from surfaces, in the enhancement of biocide efficacy or in the assistance in the water miscibility of various biocidal agents. Surfactants are also regularly used in the agrichemical business, particularly to enhance the action of herbicides. This is accomplished by using the surfactants to alter the surface behavior of the applied droplets, maximizing their interaction with the leaf surface.

One of the desirable benefits of many surfactants is their relative handling safety due to the low mammalian toxicity of many of these compounds. Additionally, many surfactants are also biodegradable. These properties have resulted in increased attention being paid to these materials as process treatment chemicals that may allow for the reduction or elimination of some proportion of the less environmentally sensitive compounds currently in regular use.

There are numerous examples of surfactants which are able to inhibit the colonization of surfaces by inhibiting the overall growth of the organisms in the target environment. Most surfactants, regardless of class, show some inhibition of surface colonization when used at concentrations high enough to impede bacterial growth. In the water treatment industry, the most well known surfactants which impart a measure of colonization resistance to submerged surfaces are the cationic quaternary amine surfactants, which also function as biocides. However, even the relatively mild nonionic surfactants can exhibit toxic effects upon microbes, e.g., bacteria or fungi; the concentration of nonionic surfactants necessary to mediate toxicity is typically substantially higher than for cationic surfactants, however.

In addition, the use of surfactants at high concentrations typically results in the discharge of large amounts of the surfactant into water treatment facilities or into the environment. Depending on the specific surfactant, the release of large quantities of these materials into the ground water may have significant environmental consequences, particularly in the absence of rapid biodegradation.

Other examples of using surfactants to prevent adhesion of bacteria to surfaces exist in the prior art. One class of surfactant that has been seen to exhibit some degree of efficacy is the polyoxyethylene-polyoxypropylene block copolymers. These materials have been demonstrated to have limited usefulness under specific conditions. Some have demonstrated efficacy for inhibiting bacterial colonization of surfaces when applied at reasonably low levels. These materials, however, only displayed efficacy for hydrophobic surfaces.

Examples of nontoxic control of surface colonization typically require the use of high concentrations of surfactants not feasible in water treatment industries where thousands or millions of gallons of water would be treated.

The present invention relates to the use of surfactants which act by inhibiting microbial adhesion to surfaces in contact with an aqueous system. The materials of the present invention have been previously used in areas such as fiber wetting in the textile industry. These materials function to inhibit adhesion at concentrations below which toxicity has been observed for the tested organisms.

DETAILED DESCRIPTION OF THE INVENTION

The present invention relates to a method for inhibiting the microbial colonization of surfaces, e.g., acrylic, ceramic or metal surfaces, in contact with an aqueous system, e.g., a cooling water system, pulping or paper making system, metal working system, or oil and gas system, which comprises adding to said system an effective amount of an anionic alkylsulfosuccinate surfactant or amphoteric surfactant, in combination with an effective amount of a non-ionic polyoxyethylene-polyoxypropylene (EO-PO) block copolymer. The present invention prevents the adhesion of microbes to said surfaces while preserving the viability of the microbes in the process stream of said system, allowing for their discharge from the system.

The present invention substantially inhibits the extent of bacterial colonization of surfaces without exhibiting toxicity toward the target population, thereby allowing for the discharge of the microbes from the system. It is expected that the treatment of the present invention will also yield a waste stream that has markedly reduced mammalian toxicity, and is thus more environmentally sensitive than current protocols that rely upon toxic biocides. This "environmentally friendly" control methodology prevents bacterial attachment without reducing the number of viable microbes. Furthermore, the class of chemicals involved in this substantially non-toxic treatment of the present invention are biodegradable (alkylsulfosuccinates).

In order to demonstrate efficacy of the present invention, a method was developed which allowed for the screening of surfactant ability to inhibit the initial colonization steps. This method involved the colonization of commercially available stainless steel discs by bacteria in the presence/absence of surfactants. The number of bacteria on a set of discs was then determined by standard methods.

The bacterial species *Pseudomonas aeruginosa*, (*P. aeruginosa*) was the organism chosen for these studies because this species has frequently been demonstrated to be among the primary colonizers of submerged surfaces. These organisms are also nearly ubiquitous in natural aquatic environments and could, therefore, be expected to be found in the process water streams in a variety of industries; the strain used was a paper mill isolate.

Several block copolymer surfactants as exemplified by the Pluronic® and Tetronic® classes of surfactants, available from BASF, were tested in combination with the preferred anionic sulfosuccinate of the present invention, a dinonyl-sulfosuccinate. Many of the block copolymers, although exhibiting little or no colonization inhibition at concentrations less than 100 mg/L when used alone, were seen to increase the efficacy of dinonylsulfosuccinate. The majority of these combinations resulted in control of surface colonization.

The materials that demonstrate the best enhancement of efficacy are the Pluronic surfactants that have between 10 and 50% polyoxyethylene, with molecular weights in the range of approximately 1,800 to 4,000. The following table demonstrates the efficacy of the present invention. The values reflect the amount of nucleic acid recovered from the adherent bacteria on discs exposed to the indicated treatment relative to adherent bacteria recovered from untreated discs. The preferred EO/PO block copolymer of the present invention, tested in the following Tables, is a Pluronic L-101 surfactant with a molecular weight of about 3800 and with 10% polyoxyethylene (Polymer A).

TABLE I

Colonization Inhibition Efficacy as a Function of the Addition of EO-PO Block Copolymer and/or Dinonylsulfosuccinate

| Dinonylsulfosuccinate (mg/L) | Polymer A (mg/L) | Nucleic Acid Recovered as Percentage of Control (%) |
|---|---|---|
| 2.0 | 0 | 100 |
| 5.0 | 0 | 100 |
| 12.0 | 0 | 55.1 |
| 48.0 | 0 | 26.4 |
| 0.5 | 1.0 | 100 |
| 2.0 | 4.0 | 36.1 |
| 5.0 | 10.0 | 13.3 |
| 12.0 | 24.0 | 12.7 |
| 48.0 | 96.0 | 15.4 |

The above results indicate that the block copolymer is able to substantially enhance the efficacy of low concentrations of dinonylsulfosuccinate. The block copolymer, alone, failed to demonstrate any colonization inhibition at concentrations up to 200 mg/L. It is expected that treatment levels of the combination of surfactants of from about 1 ppm to 150 ppm would be effective, depending on the characteristics of the treated system.

An additional result of mixing the two surfactants is that they are each minimally water soluble. Mixing the surfactants together allows for a greater proportion of active ingredients to be mixed into a given volume of water. A preferred range of mixtures of the surfactants is from a 4:1 to 1:10 ratio of dialkylsulfosuccinate:block copolymer, with a 1:2 ratio being particularly preferred. These mixtures are generally water soluble (or dispersible) in any desired proportion.

The treatment of the present invention, i.e., of enhancing colonization inhibition efficacy by mixing block copolymers with other surfactants is not limited to dinonylsulfosuccinate. Other members of the alkylsulfosuccinate family are also given much more significant colonization inhibition efficacy when mixed with an EO-PO polymer. Sulfosuccinates with alkyl chain lengths of from about 5 to 13 carbons demonstrate enhanced efficacy when mixed with block copolymers. Table II demonstrates the enhancement observed when mixing the preferred block copolymer of the present invention (Polymer A) with two additional types of alkylsulfosuccinates, a dioctylsulfosuccinate (diethylhexylsulfosuccinate) and a diamylsulfosuccinate. The experimental system is similar to that described in Table I, above.

TABLE II

Colonization Inhibition Efficacy as a Function of Addition of EO-PO Block Copolymer and/or Diethylhexyl- or Diamyl-Sulfosuccinate

| Alkylsulfosuccinate Concentration (mg/L) | Polymer A Concentration (mg/L) | Nucleic Acid Recovered as % of Control |
|---|---|---|
| Diamyl-2 | 0 | 95 |
| Diamyl-5 | 0 | 100 |
| Diamyl-10 | 0 | 100 |

TABLE II-continued

Colonization Inhibition Efficacy as a Function of Addition of EO-PO Block Copolymer and/or Diethylhexyl- or Diamyl-Sulfosuccinate

| Alkylsulfosuccinate Concentration (mg/L) | Polymer A Concentration (mg/L) | Nucleic Acid Recovered as % of Control |
|---|---|---|
| Diamyl-2 | 2.7 | 100 |
| Diamyl-5 | 6.7 | 82.4 |
| Diamyl-10 | 13.3 | 57.1 |
| Diethylhexyl-2 | 0 | 100 |
| Diethylhexyl-5 | 0 | 100 |
| Diethylhexyl-10 | 0 | 80 |
| Diethylhexyl-2 | 3.1 | 71.2 |
| Diethylhexyl-5 | 7.7 | 22.1 |
| Diethylhexyl-10 | 15.4 | 13.7 |

Table III demonstrates the type of efficacy enhancement observed with amphoteric surfactants, specifically, amphoteric surfactants derived from dipropionic acid. One of the surfactants tested was a sodium $C_{12-15}$ alkoxypropyl iminodipropionate. This material was mixed with the preferred block copolymer surfactant (Polymer A) of the present invention.

TABLE III

Colonization Inhibition Efficacy as a Function of Addition of EO-PO Block Copolymer and/or Sodium $C_{12-15}$ Alkoxypropyl Iminodipropionate

| Alkoxypropyl Iminodipropionate Concentration (mg/L) | Polymer A Concentration (mg/L) | Nucleic Acid Recovered as % of Control |
|---|---|---|
| 5 | 0 | 100 |
| 15 | 0 | 100 |
| 25 | 0 | 100 |
| 35 | 0 | 100 |
| 50 | 0 | 100 |
| 5 | 14.3 | 100 |
| 15 | 42.9 | 17.1 |
| 25 | 71.5 | 19.8 |
| 35 | 100.1 | 15.3 |
| 50 | 143.0 | 6.5 |

While we have shown and described herein certain embodiments of the present invention, it is intended that there be covered as well any change or modification therein which may be made without departing from the spirit and scope of the invention.

We claim:

1. A method for inhibiting the microbial colonization of surfaces in contact with an aqueous system which comprises adding to said system from about 1 to 150 ppm of a combination of (a) alkylsulfosuccinate surfactant with alkyl chain lengths of from about 5 to 13 carbons and (b) polyoxyethylene-polyoxypropylene block copolymer surfactant to substantially prevent adhesion of microbes to said surfaces while preserving the viability of microbes in said system, allowing for discharge of the microbes from said system, said polyoxyethylene-polyoxypropylene block copolymer surfactant exhibiting no colonization inhibition or substantially no colonization inhibition at concentrations less than 100 mg/l when used alone.

2. The method of claim 1 wherein said polyoxyethylene-polyoxypropylene block copolymer surfactant exhibits no colonization inhibition or substantially no colonization inhibition at concentrations less than 200 mg/l when used alone.

3. The method of claim 1 wherein the alkylsulfosuccinate surfactant comprises at least one of diamylsulfosuccinate, diethylhexylsulfosuccinate and dinonylsulfosuccinate.

4. The method of claim 1 wherein the weight ratio of (a):(b) is about from 4:1 to 1:10.

5. The method of claim 4 wherein the weight ratio of (a):(b) is about 1:2.

6. The method of claim 1 wherein said aqueous system comprises a pulping or papermaking system.

7. The method of claim 1 wherein said aqueous system comprises a cooling water system.

8. The method of claim 1 wherein said aqueous system comprises a metal working system.

9. The method of claim 1 wherein said aqueous system comprises an oil and gas system.

10. The method of claim 1 wherein said surfaces are acrylic, ceramic, or metal.

11. The method of claim 1 wherein said surfaces are stainless steel.

* * * * *